J. C. HOWE.
ADJUSTABLE TRANSMISSION MECHANISM.
APPLICATION FILED JAN. 15, 1916.
1,206,538.
Patented Nov. 28, 1916.
2 SHEETS—SHEET 1.
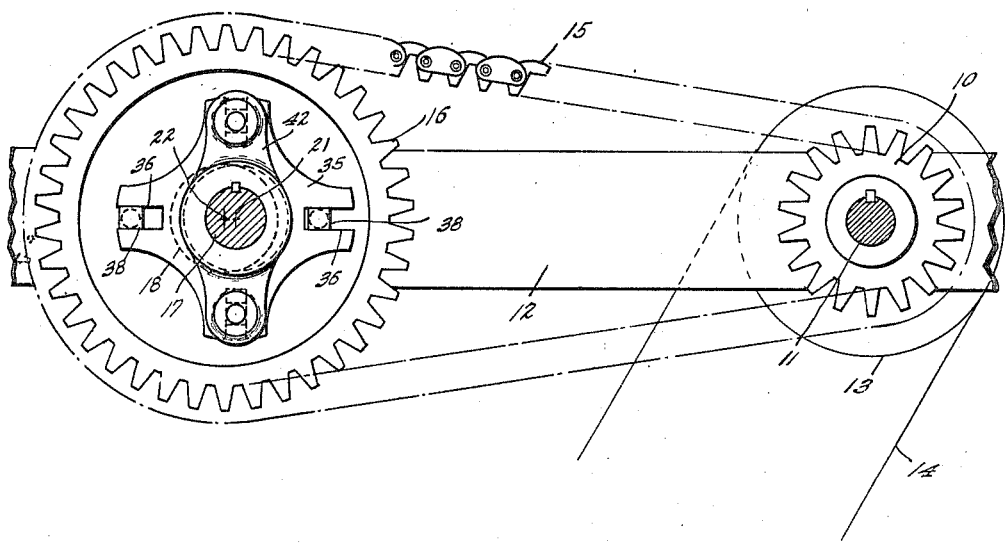
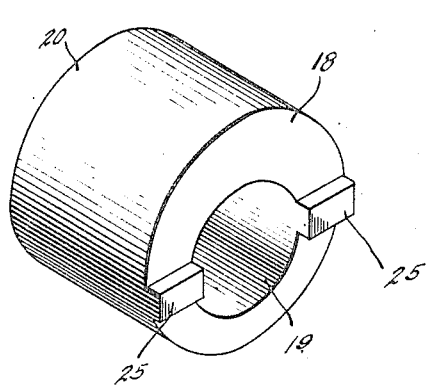
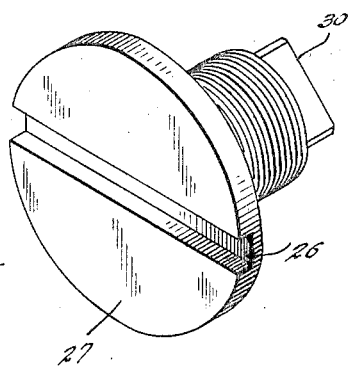
WITNESSES:
INVENTOR
John C. Howe,
BY
Hood & Schley
ATTORNEYS

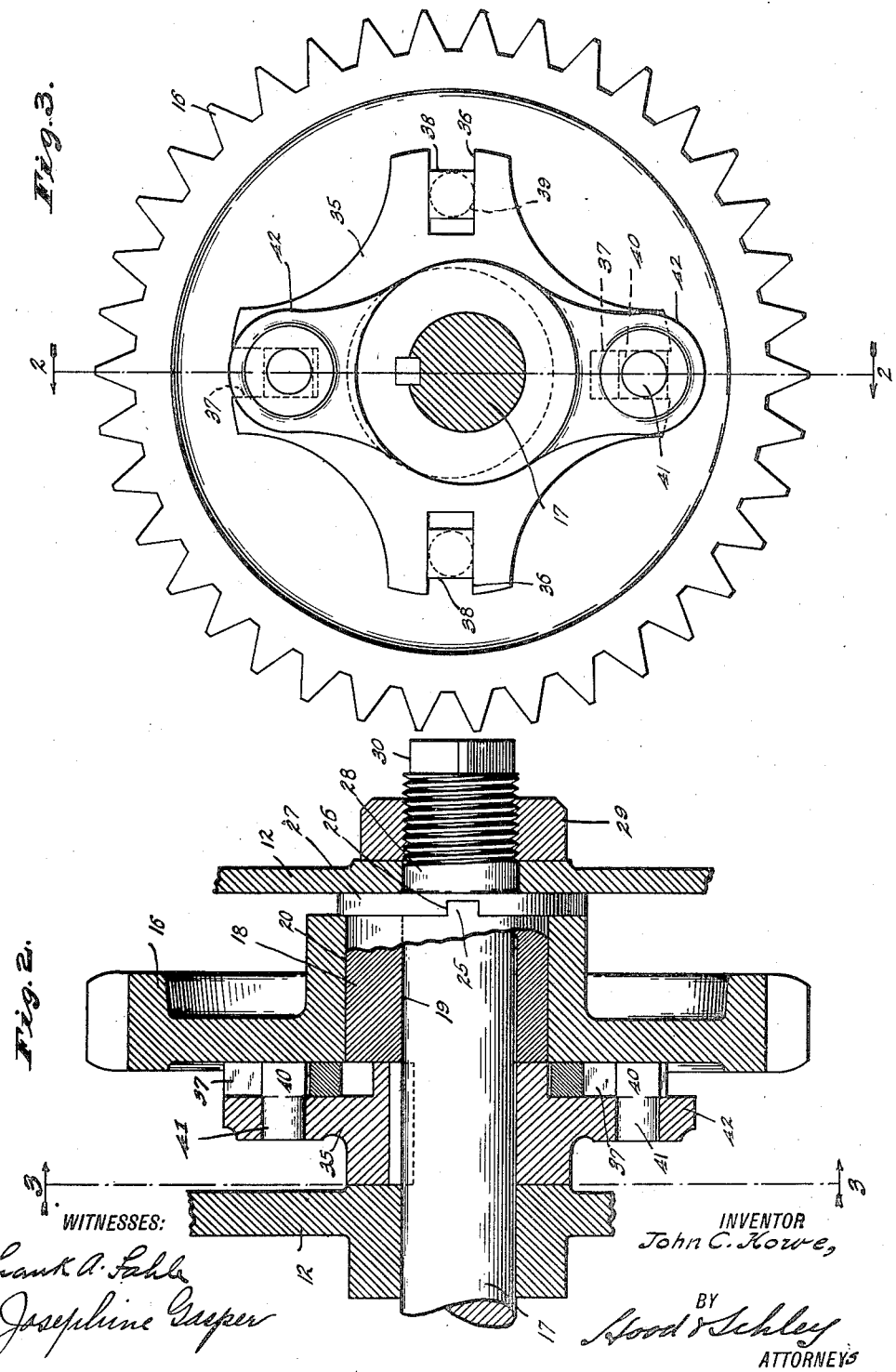

UNITED STATES PATENT OFFICE.

JOHN CLARK HOWE, OF INDIANAPOLIS, INDIANA.

ADJUSTABLE TRANSMISSION MECHANISM.

1,206,538.  Specification of Letters Patent.  Patented Nov. 28, 1916.

Application filed January 15, 1916. Serial No. 72,188.

*To all whom it may concern:*

Be it known that I, JOHN C. HOWE, a citizen of the United States, residing at Indianapolis, in the county of Marion and State of Indiana, have invented a new and useful Adjustable Transmission Mechanism, of which the following is a specification.

It is the object of my invention to mount a power-transmitting member, such as a gear, sprocket, pulley, or friction wheel, so that its axis of rotation can be adjusted relatively to that of the connected shaft, whereby proper adjustment may be made easily and wear can be compensated for.

In carrying out my invention, I mount the power-transmitting member on a bushing which is adjustable about an axis eccentric to the surface on which the power-transmitting member rotates thereon, so that rotation of such bushing about such axis shifts the axis of rotation of such power-transmitting member, and connects the power-transmitting member to the associated shaft, which has a fixed axis of rotation, by a floating plate which has a sliding engagement with the power-transmitting member and with the shaft on lines which are at an angle to each other and are transverse to the axes of the shaft and the power-transmitting member.

In the accompanying drawings, I have illustrated my invention with a sprocket as the power-transmitting member, this sprocket being connected by a chain to another sprocket, so that by the adjustment of the power-transmitting member the chain may be tightened or loosened.

Figure 1 is an elevation, with the shafts in section, showing two sprockets interconnected by a chain, with one of the sprockets mounted in accordance with my invention; Fig. 2 is a section on the line 2—2 of Fig. 3, through the adjustable sprocket wheel and its mounting; Fig. 3 is a section on the line 3—3 of Fig. 2, showing in elevation on a somewhat larger scale than Fig. 1, and in a somewhat different adjustment, the adjustable sprocket wheel and its mounting; Fig. 4 is a perspective view of the adjustable bushing on which the adjustable sprocket wheel is mounted; and Fig. 5 is a perspective view of the adjusting means for the adjustable bushing.

The sprocket wheel 10 is fixed on a shaft 11 mounted in a frame 12, this shaft being connected in any suitable way to any suitable driving or driven mechanism, as by a pulley 13 and belt 14. The pulley 10 is connected by a chain 15 to a sprocket 16 which is adjustably mounted on and connected to a shaft 17 in accordance with my invention.

The shaft 17 is suitably mounted, as in one side of the same frame 12 in which the shaft 11 is mounted, and rotates on a fixed axis. On the end of the shaft 17 is mounted a bushing 18, on which in turn is mounted the sprocket 16. The inner surface 19 and the outer surface 20 are both cylindrical surfaces, and rotatably fit upon the shaft 17 and within the hub of the sprocket 16 respectively. These two surfaces 19 and 20, are eccentric, the surface 19 having the axis 21 of the shaft 17 as its axis and the surface 20 having a separate axis 22, which thus is also the axis of the sprocket 16. Thus the sprocket 16 and the shaft 17 are not co-axial. By rotating the bushing 18 about the shaft 17, the axis 22 is rotated about the axis 21, so that the axis of the sprocket 16 is thus moved relatively to the axis of the shaft 17, and the sprocket 16 itself is shifted bodily, so as to produce a tightening or loosening of the chain 15.

The shifting of the bushing 18 may be obtained in any suitable way. As shown, the bushing 18 is provided at one end— the end toward the opposite side of the frame 12 from the one from which the shaft 17 projects—with a transverse tongue 25, which fits into a transverse groove 26 in a plate 27 having a stem 28 rotatably mounted in the side of the frame 12. This stem 28 projects through the frame 12, and its projecting portion is screw-threaded to receive a lock nut 29, and the outer end of the stem 28 is provided with a squared portion 30 for receiving a wrench, whereby, with the lock nut 29 loosened, the stem 28 and plate 27 may be turned in the frame 12 to produce a corresponding turning of the bushing 18. While it is possible to make the bushing 18 integral with the plate 27, I prefer the separate construction shown, as it is easier to make and compensates for any inaccuracies in machining.

In order to connect the sprocket 16 and shaft 17 without interfering with their rotation about separated axes, I provide a floating plate 35, which at its edge is provided with a pair of diametrically opposite radial notches or slots 36 and with a second pair of diametrically opposite radial notches or slots 37, the two pairs of notches being on diameters of the plate 35 which intersect at right angles. Slidingly fitting in the notches 36 are the squared heads 38 of pins 39 projecting from the side of the gear 16. Slidingly fitting in the notches 37 are the squared heads 40 of pins 41 projecting from the side of a collar 42 keyed on the shaft 17. As the shaft 17 and sprocket 16 rotate about their axes 21 and 22 respectively, the squared heads 38 and 40 of the pins 39 and 41 move in and out along the notches 36 and 37, and thus rotate the floating plate 35 so that power is transmitted between the sprocket 16 and shaft 17 through such floating plate 35, the pins 39 and 41, and the collar 42.

When wear occurs, and the chain 15 becomes loose, the lock nut 29 is loosened, the stem 28 is turned by a wrench on its squared portion 30 to rotate through the necessary angle the bushing 18, and thus the axis 22 of the sprocket 16 is shifted around the axis 21 of the shaft 17 to increase the distance of the axis 22 from the axis of the shaft 11, so as to tighten the chain 15.

While I have described my invention in connection with a chain and sprocket drive, it is not limited to this type of drive, but is applicable to other forms of transmission mechanisms.

I claim as my invention:

1. In combination, a shaft, a power-transmitting member, a supporting member on which said power-transmitting member is rotatably mounted, said supporting member being itself supported on said shaft, the interengaging surfaces of rotation about which said power-transmitting member rotates on said supporting member having an axis which is separated from the axis of said shaft, said supporting member being rotatably adjustable about the axis of the shaft, a rotatably mounted member separable from said supporting member for adjusting the latter about the shaft axis, a floating plate provided with angularly separated slots, and parts carried by said shaft and said power-transmitting member respectively and slidingly fitting in said angularly separated slots in said floating plate.

2. In combination, a shaft mounted for rotation about a fixed axis, a power-transmitting member mounted for rotation about an axis, means for rotatably supporting said power-transmitting member so that its axis can be shifted relatively to the axis of said shaft, a rotatably mounted member separable from said supporting means for shifting the latter to shift the axis of said power-transmitting member, a floating plate provided with angularly separated slots, and parts carried by said power-transmitting member and said shaft respectively and slidingly fitting in said slots.

3. In combination, a shaft mounted for rotation about a fixed axis, a power-transmitting member mounted for rotation about an axis which is separated from the axis of said shaft, means for rotatably supporting said power-transmitting member so that its axis can be rotated angularly about the axis of said shaft a rotatably mounted member separable from said supporting means for shifting the latter to shift the axis of said power-transmitting member, a floating plate provided with angularly separated slots, and parts carried by said power-transmitting member and said shaft respectively and slidingly fitting in said slots.

4. In combination, a shaft mounted to rotate about a fixed axis, an angularly adjustable, normally fixed bushing in which said shaft has a rotatable mounting, said bushing having eccentric inner and outer surfaces, a rotatably mounted member separable from the bushing for rotatably adjusting the bushing, a power-transmitting member mounted on the outer surface of said bushing, a floating plate provided with angularly separated slots, and parts carried by said shaft and said power-transmitting member respectively and having a sliding fit in said respective slots.

5. In combination, a shaft, a power-transmitting member, a supporting member on which said power-transmitting member is rotatably mounted, said supporting member being itself supported on said shaft, the interengaging surfaces of rotation about which said power-transmitting member rotates on said supporting member having an axis which is separated from the axis of said shaft, said supporting member being rotatably adjustable about the axis of the shaft, a rotatably mounted member separable from said supporting member for adjusting the latter about the shaft axis, and means rotatable with said power-transmitting member and said shaft and interconnecting them to transmit power between them while allowing them to rotate about different axes.

6. In combination, a shaft mounted for rotation about a fixed axis, a power-transmitting member mounted for rotation about an axis, means for rotatably supporting said power-transmitting member so that its axis can be shifted relatively to the axis of said shaft, a rotatably mounted member separable from said supporting means for shifting the latter to shift the axis of said power-transmitting member, and means rotatable with said power-transmitting member and said shaft and interconnecting them to transmit power between them while allowing them to rotate about different axes.

7. In combination, a shaft mounted for rotation about a fixed axis, a power-transmitting member mounted for rotation about an axis which is separated from the axis of said shaft, means for rotatably supporting said power-transmitting member so that its axis can be rotated angularly about the axis of said shaft, a rotatably mounted member separable from said supporting means for shifting the latter to shift the axis of said power-transmitting member, and means rotatable with said power-transmitting member and said shaft and interconnecting them to transmit power between them while allowing them to rotate about different axes.

In witness whereof, I have hereunto set my hand at Indianapolis, Indiana, this eleventh day of January, A. D. one thousand nine hundred and sixteen.

JOHN CLARK HOWE.